United States Patent
Jeong et al.

(10) Patent No.: US 11,967,466 B2
(45) Date of Patent: Apr. 23, 2024

(54) MULTI-LAYER CERAMIC ELECTRONIC COMPONENT

(71) Applicant: SAMSUNG ELECTRO-MECHANICS CO., LTD., Suwon-si (KR)

(72) Inventors: Do Young Jeong, Suwon-si (KR); Ga Young An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 140 days.

(21) Appl. No.: 17/471,382

(22) Filed: Sep. 10, 2021

(65) Prior Publication Data

US 2022/0208468 A1    Jun. 30, 2022

(30) Foreign Application Priority Data

Dec. 31, 2020  (KR) .......................... 10-2020-0189800

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *H01G 4/008* (2013.01); *H01G 4/012* (2013.01); *H01G 4/12* (2013.01)

(58) Field of Classification Search
CPC .......... H01G 4/008; H01G 4/012; H01G 4/12; H01G 4/1209; H01G 4/232; H01G 4/30
See application file for complete search history.

(56) References Cited

U.S. PATENT DOCUMENTS

| | | | |
|---|---|---|---|
| 2016/0086733 A1* | 3/2016 | Saito ................... | H01G 4/1227 205/183 |
| 2019/0131076 A1 | 5/2019 | Fukumura | |
| 2020/0203073 A1* | 6/2020 | Asano ...................... | H01G 4/12 |
| 2021/0065986 A1* | 3/2021 | Kim ........................ | H01G 4/012 |

FOREIGN PATENT DOCUMENTS

| | | |
|---|---|---|
| JP | 2010-027730 A | 2/2010 |
| JP | 2019-083291 A | 5/2019 |
| KR | 10-2019-0116161 A | 10/2019 |

* cited by examiner

*Primary Examiner* — Nathan Milakovich
(74) *Attorney, Agent, or Firm* — MORGAN, LEWIS & BOCKIUS LLP

(57) ABSTRACT

A multilayer ceramic electronic component includes: a ceramic body including a dielectric layer, and a first internal electrode and a second internal electrode disposed to be alternately stacked with the dielectric layer interposed therebetween; a first external electrode including a first electrode layer, a first conductive layer, and a first metal layer; a second external electrode including a second electrode layer, a second conductive layer, and a second metal layer; and a protective layer disposed on the ceramic body, the first electrode layer, and the second electrode layer, wherein a sum of through areas of the through portions disposed on the first electrode layer and the second electrode layer among the protective layers may be 50% or more of a sum of surface areas of the first electrode layer and the second electrode layer.

9 Claims, 7 Drawing Sheets

MULTI-LAYER CERAMIC ELECTRONIC COMPONENT

CROSS-REFERENCE TO RELATED APPLICATION

This application claims benefit of priority to Korean Patent Application No. 10-2020-0189800 filed on Dec. 31, 2020 in the Korean Intellectual Property Office, the disclosure of which is incorporated herein by reference in its entirety.

BACKGROUND

1. Field

The present disclosure relates to a multilayer ceramic electronic component.

2. Description of Related Art

In recent years, as the field of applications of electronic products has expanded, a technical field in which multilayer ceramic electronic components are also used is also expanding. In particular, a structure in which an electronic control unit (ECU) or a transmission control unit (TCU) of a vehicle is disposed in an engine bay or directly attached to a transmission is used according to the electronicization of vehicles.

However, when an existing multilayer ceramic electronic component is applied to harsh environments such as high temperature, high vibration, and similar environments, expansion and contraction due to high/low temperature cycles are repeated, resulting in continuous mechanical stress. In addition, continuous application of mechanical stress is a major cause of occurring cracks in terminal electrodes or a solder.

In addition, in a process of manufacturing multilayer ceramic electronic components, there are many cases in which a plating layer is formed on an external electrode after sintering the ceramic body and the external electrode, and when manufacturing electronic components by high-temperature heat treatment, a hydrophilic oxide layer having high surface energy may be formed on a surface of the ceramic body, and a probability of generating pores serving as a path through which moisture can penetrate increases at an interface between the ceramic body and the external electrode.

In particular, when continuously exposed to a high temperature and/or high humidity environment, chip cracks may occur when external stress, such as a thermal load, or the like is applied between a region mounted on the substrate and a region exposed externally. Accordingly, even if stress is applied, a multilayer ceramic electronic component may have strong flexural strength capable of preventing cracks from occurring. However, when a reinforcing layer is formed on an external region to increase flexural strength, problems such as deterioration of electrical properties may occur.

SUMMARY

An aspect of the present disclosure is to provide a multilayer ceramic electronic component capable of improving flexural strength.

An aspect of the present disclosure is to provide a multilayer ceramic electronic component having a low ESR.

An aspect of the present disclosure is to provide a multilayer ceramic electronic component having excellent reliability.

According to an aspect of the present disclosure, a multilayer ceramic electronic component, includes: a ceramic body including a dielectric layer, and a first internal electrode and a second internal electrode disposed to be alternately stacked in a third direction with the dielectric layer interposed therebetween, and including first and second surfaces opposing each other in a first direction, third and fourth surfaces opposing each other in a second direction, and fifth and sixth surfaces opposing each other in a third direction; a first external electrode connected to the first internal electrode and including a first electrode layer, a first conductive layer, and a first metal layer; a second external electrode connected to the second internal electrode and including a second electrode layer, a second conductive layer, and a second metal layer; and a protective layer disposed on the ceramic body, the first electrode layer, and the second electrode layer, wherein the protective layer includes a plurality of through portions disposed on the ceramic body, the first electrode layer and/or the second electrode layer, wherein a sum of through areas of the through portions disposed on the first electrode layer and the second electrode layer among the protective layers maybe 50% or more of a sum of surface areas of the first electrode layer and the second electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
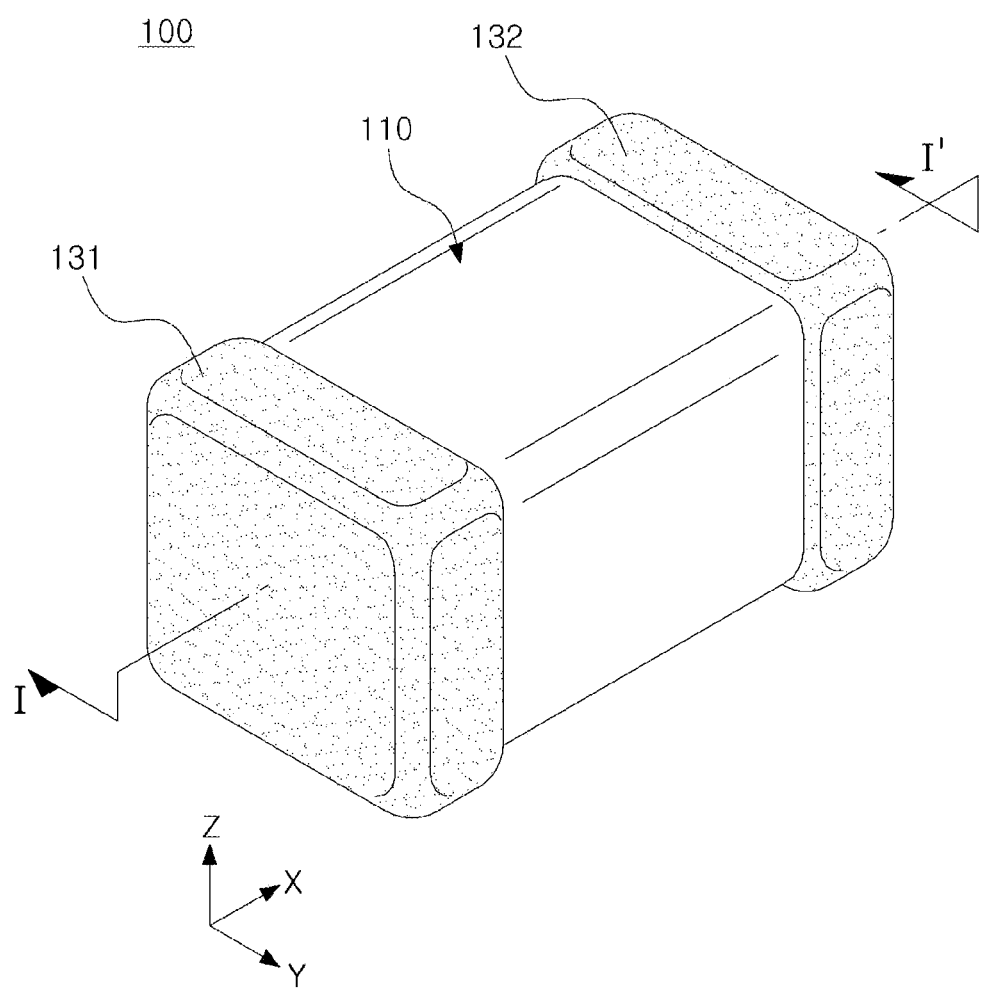
FIG. 1 is a perspective view schematically illustrating a multilayer ceramic electronic component according to an embodiment of the present disclosure.
Figure 2:
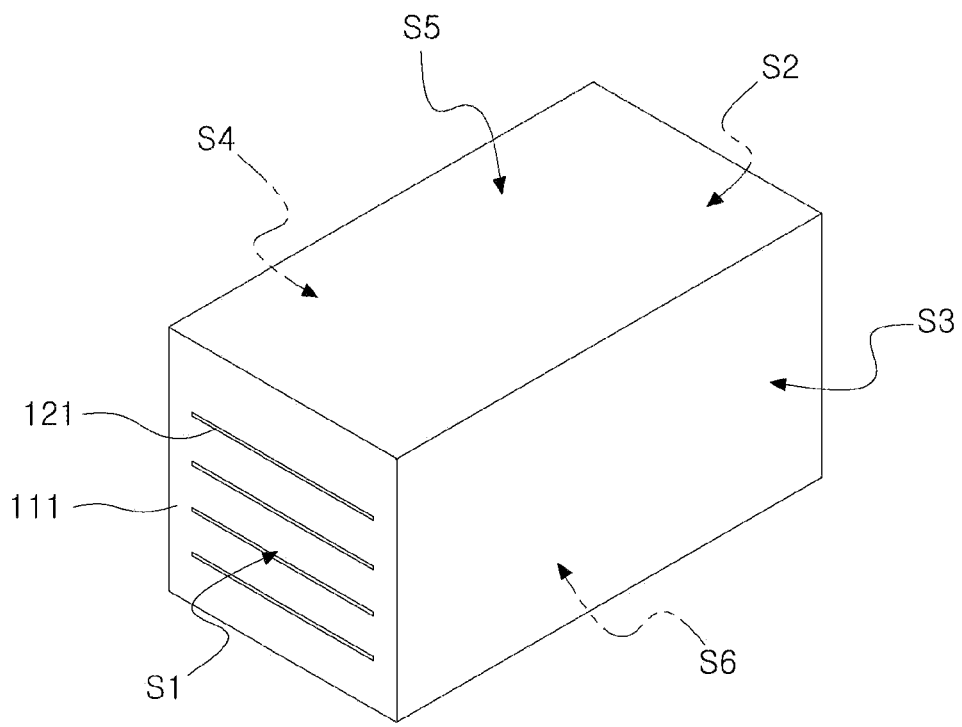
FIG. 2 is a perspective view schematically illustrating the ceramic body of FIG. 1.
Figure 2:
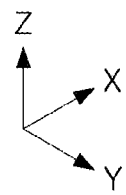

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals maybe used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawings, an X direction may be defined as a first direction, and an L direction or a length direction, a Y direction may be defined as a second direction, and a W direction or a width direction, and a Z direction may be defined as a third direction, and a T direction or a thickness direction.

The present disclosure relates to a multilayer ceramic electronic component. FIGS. 1 to 4 are views schematically illustrating a multilayer ceramic electronic component according to an embodiment of the present disclosure. Referring to FIGS. 1 to 4, a multilayer ceramic electronic component 100 according to an embodiment of the present disclosure may include a ceramic body including a dielectric layer, and a first internal electrode and a second internal electrode disposed to be alternately stacked in a third direction with the dielectric layer interposed therebetween, and including first and second surfaces opposing each other in a first direction, third and fourth surfaces opposing each other in a second direction, and fifth and sixth surfaces opposing each other in a third direction; a first external electrode connected to the first internal electrode and including a first electrode layer, a first conductive layer, and a first metal layer; a second external electrode connected to the second internal electrode and including a second electrode layer, a second conductive layer, and a second metal layer; and a protective layer disposed on the ceramic body, the first electrode layer, and the second electrode layer.

In this case, the protective layer may include a plurality of through portions disposed on the ceramic body, the first electrode layer and/or the second electrode layer. A sum of through areas of the through portions disposed on the first electrode layer and the second electrode layer among the protective layers may be 50% or more of a sum of surface areas of the first electrode layer and the second electrode layer.

Mechanical and moisture resistance reliability of multilayer ceramic electronic components are largely influenced by two factors. First, product defects may occur due to penetration of a plating solution during a manufacturing process thereof, and second, when repeatedly exposed to high temperature and/or high humidity environments, a product lifespan may be shortened due to thermal stress generated by repeated contraction and expansion. Recently, in order to satisfy various electrical properties and/or mechanical properties at the same time as the size of products has become smaller, a structure in which an exterior reinforcing material, or the like, is disposed externally of the multilayer ceramic electronic component is used. Such a reinforcing material has an advantage of being capable of improving the mechanical strength of the product, but there is a problem in that electrical characteristics of the product may be deteriorated due to the reinforcing material disposed in the external electrode region. In the multilayer ceramic electronic component according to the present disclosure, the sum of the through areas of the through portions among the protective layers, disposed on the first electrode layer and the second electrode layer may be 50% or more of the total surface area of the first electrode layer and the second electrode layer, such that the multilayer ceramic electronic component may have excellent mechanical reliability and can prevent deterioration of electrical characteristics.

A multilayer ceramic electronic component 100 according to an embodiment of the present disclosure may include a ceramic body 110 including a dielectric layer 111 and first and second internal electrodes 121 and 122 disposed to be stacked in a third direction (Z direction) with a dielectric layer 111 and the dielectric layer 111 interposed therebetween.

The ceramic body 110 may include first and second surfaces S1 and S2 opposing in a first direction (X direction), and third and fourth surfaces S3 and S4 opposing in a second direction (Y direction), fifth and sixth surfaces S5 and S6 opposing in a third direction (Z direction).

There is no particular limitation on the specific shape of the ceramic body 110, but as shown, the ceramic body 110 may have a hexahedral shape or a similar shape. Due to shrinkage of the ceramic powder included in the ceramic body 110 during a sintering process, the ceramic body 110 may have a substantially hexahedral shape although not a hexahedral shape having a complete straight line. If necessary, the ceramic body 110 may be rounding processed so that corners are not angled. The rounding process may use, for example, barrel polishing, but is not limited thereto.

In the ceramic body 110, a dielectric layer 111, a first internal electrode 121, and a second internal electrode 122 may be alternately stacked. The dielectric layer 111, the first internal electrode 121, and the second internal electrode 122 maybe stacked in a third direction (Z direction) . The plurality of dielectric layers 111 are in a sintered state, a boundary between the adjacent dielectric layers 111 may be integrated to such an extent that it is difficult to determine without using a scanning electron microscope (SEM).

According to an embodiment of the present disclosure, the dielectric layer 111 may include a component, represented by $(Ba_{1-x}Ca_x)(Ti_{1-y}(Zr, Sn, Hf)_y)O_3$ (where, $0 \le x \le 1$, $0 \le y \le 0.5$). The component may be, for example, a chemical in which Ca, Zr, Sn and/or Hf is partially dissolved in $BaTiO_3$. In the above compositional formula, x may be in a range of 0 or more and 1 or less, and y may be in a range of 0 or more and 0.5 or less, but is not limited thereto. For example, in the above composition formula, when x is 0, y is 0, and z is 0, the component maybe $BaTiO_3$. In addition, various ceramic additives, organic solvents, plasticizers, binders, dispersants, or the like may be added to the above components according to the purpose of the present disclosure.

The dielectric layer 111 may be formed by adding an additive to a slurry containing the above-described material, and applying and drying the same on a carrier film to prepare a plurality of ceramic sheets. The ceramic sheet maybe formed by manufacturing the slurry in a sheet shape having a thickness of several μms by a doctor blade method, but is not limited thereto.

The ceramic body 110 may be formed by alternately stacking a ceramic green sheet on which a first internal electrode 121 is printed and a ceramic green sheet on which a second internal electrode 122 is printed on the dielectric layer 111 in a third direction (Z direction). A printing method of the first and second internal electrodes 121 and 122 may be a screen-printing method or a gravure printing method, but is not limited thereto.

The first and second internal electrodes 121 and 122 may be stacked so that respective cross-sections thereof are exposed to both opposite end portions of the ceramic body 110, respectively. Specifically, the first and second internal electrodes 121 and 122 may be exposed to both surfaces of the ceramic body 110 in the first direction (X direction), respectively, and the first internal electrode 121 may be exposed in the direction of the first surface S1 of the ceramic body 110 and the second internal electrode 122 may be exposed in the direction of the second surface S2.

The first and second internal electrodes 121 and 122 may include conductive metal. The conductive metal may include one or more, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), and alloy thereof. The first and second internal electrodes 121 and 122 may be formed using a conductive paste containing the conductive metal.

In the multilayer ceramic electronic component according to the present disclosure, a first external electrode 131 and a second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 110.

In one example, the first external electrode 131 of the multilayer ceramic electronic component of the present disclosure may include a first electrode layer 131a, a first conductive layer 131b, and a first metal layer 131c, and the second external electrode 132 may include a second electrode layer 132a, a second conductive layer 132b, and a second metal layer 132c. In some embodiments, a protective layer may be disposed between the first electrode layer 131a and the first conductive layer 131b and/or between the second electrode layer 132a and the second conductive layer 132b. That is, in the first external electrode 131 of the multilayer ceramic electronic component according to the present example, a first electrode layer 131a, a protective layer, a first conductive layer 131b, and a first metal layer 131c may be sequentially stacked, and in the second external electrode 132, a second electrode layer 132a, a protective layer, a second conductive layer 132b, and a second metal layer 132c may be sequentially stacked. The first electrode layer 131a may be connected to the first internal electrode 121, and the second electrode layer 132b may be connected to the second internal electrode 122.

In an embodiment of the present disclosure, the first electrode layer 131a and the second electrode layer 132a of the multilayer ceramic electronic component may be plastic electrodes including a conductive metal. The conductive metal may include, for example, nickel (Ni), copper (Cu), tin (Sn), palladium (Pd), platinum (Pt), iron (Fe), gold (Au), silver (Ag), tungsten (W), titanium (Ti), lead (Pb), or one or more of alloys thereof.

As an example of a method of forming the first electrode layer 131a and the second electrode layer 132a, the first electrode layer 131a and the second electrode layer 132a may be formed by dipping a ceramic body into a conductive paste containing the conductive metal and then sintering the same, or formed by printing the conductive paste containing the conductive metal on the surface of the ceramic body by a screen printing method or a gravure printing method and sintering the same. In addition, the first electrode layer 131a and the second electrode layer 132a may be formed by applying the conductive paste to the surface of the ceramic body or transferring a dried film obtained by drying the conductive paste onto the ceramic body and then sintering the same, but is not limited thereto. For example, it may be formed by a conductive paste on a ceramic body and then sintering the same by various methods other than the above-described methods.

In some embodiments, at least a portion of the first external electrode layer 131 of the multilayer ceramic electronic component according to the present disclosure may be disposed to extend onto the third surface S3, the fourth surface S4, the fifth surface S5, and the sixth surface S6 of the ceramic body 110. In addition, at least a portion of the second external electrode layer 132 may be disposed to extend onto the third surface S3, the fourth surface S4, the fifth surface S5, and the sixth surface S6 of the ceramic body 110. In this case, the first electrode layer 131 and the second electrode layer 132 may be disposed on the third to sixth surfaces of the ceramic body to be spaced apart from each other. When at least a portion of the first electrode layer 131 and/or the second electrode layer 132 is formed to extend onto the third surface S3, the fourth surface S4, the fifth surface S5, and the sixth surface S6 of the ceramic body 110, respectively, the extended portion may function as a so-called band portion, and may function to improve mounting strength of the multilayer ceramic electronic component 100 according to the present disclosure and prevent moisture penetration.

Figure 3:
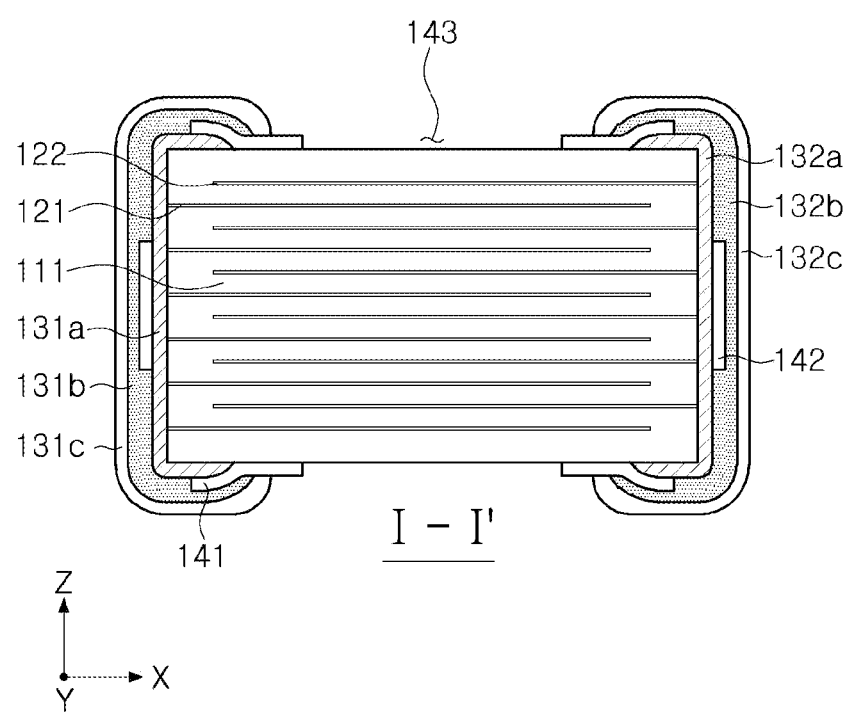
FIG. 3 is a cross-sectional view taken along line I-I' of FIG. 1.

In some embodiments of the present disclosure, a protective layer 141 and 142 may be disposed on the ceramic body, the first electrode layer 131a, and the second electrode layer 132a of the multilayer ceramic electronic component. The protective layer may be disposed to cover at least a portion of the ceramic body, the first electrode layer, and the second electrode layer. As shown in FIG. 3, as necessary, a separate through region 143 may be formed and disposed on the ceramic body.

In some embodiments, the protective layer may be disposed on a region in which the first electrode layer 131a ends and a region in which the second electrode layer 132a ends, and the first conductive layer 131b and the second conductive layer 132b may be disposed on the protective layer. The region in which the ceramic body and the first and second electrode layers meet is a region in which a ceramic material and a heterogeneous material of conductive metal are in contact, and corresponds to a region in which lifting may be likely to occur. As in the present example, the protective layer may be disposed on the region in which the ceramic body and the first electrode layer 131a meet, and on the region in which the ceramic body and the second electrode layer 132a meet, thereby improving the mechanical strength of the multilayer ceramic electronic component.

The protective layer of the multilayer ceramic electronic component according to the present disclosure may include a plurality of through portions disposed on the ceramic body, the first electrode layer 131a, and the second electrode layer 132a. Referring to FIG. 3, a through portion may be formed on the same layer or level that the protective layer is disposed on the ceramic body, the first electrode layer, and the second electrode layer. The through portion may be disposed to penetrate through the protective layer, and two or more through portions may be disposed. The through portion is a region in which the protective layer is not disposed, and may function as a connection passage connecting the first and second electrode layers 131a and 132a and first and second conductive layers 131b and 132b, respectively. In the multilayer ceramic electronic component according to the present example, since the protective layer has a plurality of through portions, connectivity between the first and second electrode layers 131a and 132a and the first and second conductive layers 131b and 132b may be improved.

A sum of surface areas of the first electrode layer 131a and the second electrode layer 132a on which the protective layer is not disposed (i.e., surface areas of the first electrode layer 131a and the second electrode layer 132a on which the through portions are formed) may be 50% or more of the total surface areas of the first and second electrode layers. In the present specification, an "area" of a first member may mean a surface area in which the member is in contact with a material having different properties, and a "through area" of a second member disposed on the first member may mean an area of a region in which the second member is not disposed, and may be a region in which the first member is in contact with components other than the second member. The through area may be values measured with respect to a cut plane, passing through a center of the multilayer ceramic electronic component and perpendicular to a second direction, and may be a value calculated through an image analysis program (Mediacybernetics' Image Pro Plus ver 4.5) after an image of cut sections of the electronic component is captured using an optical device such as a scanning electron microscope (SEM, Jeol's JSM-7400F). The multilayer ceramic electronic component according to the present disclosure may have not only excellent reliability but also low ESR by adjusting the through area of the through portion of the protective portion as described above.

In one example, when a virtual plane that passes through a center of the ceramic body of the multilayer ceramic electronic component and is perpendicular to the third direction is referred to as a reference plane, the protective layer may be disposed on one side of the reference plane in the third direction among the surfaces of the first electrode layer and the second electrode layer.

Figure 4:
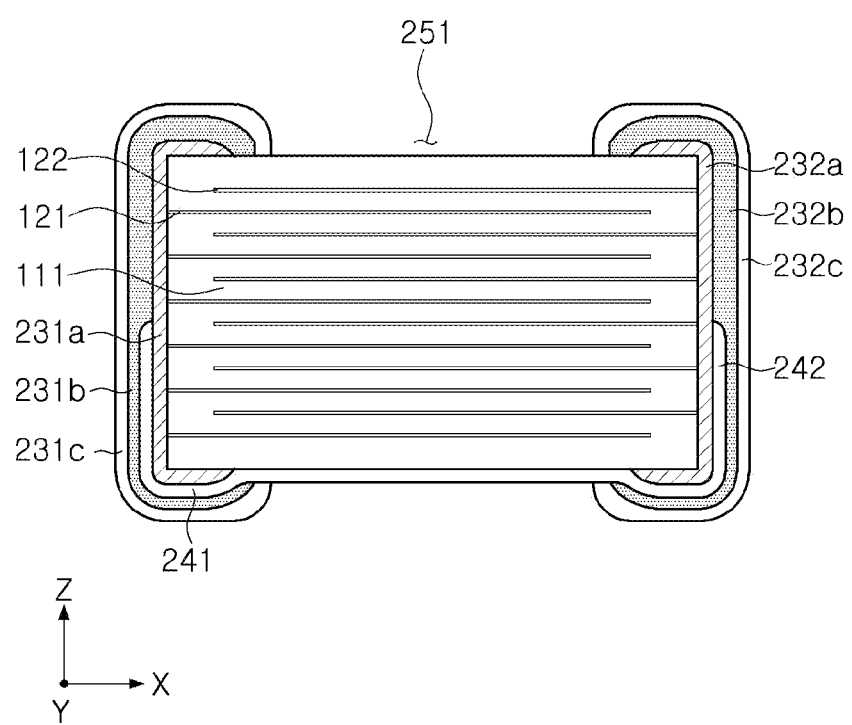
FIG. 4 is a cross-sectional view schematically illustrating a multilayer ceramic electronic component according to one embodiment of the present disclosure.

In one example, when a virtual plane that passes through a center of the ceramic body of the multilayer ceramic electronic component and is perpendicular to the third direction is referred to as a reference plane, the protective layer 241 and 242 may be disposed on one side of the reference plane in the third direction among the surfaces of the first electrode layer and the second electrode layer. Referring to FIG. 4, the protective layer of the present example may be disposed below or above the reference plane. In a protective layer of the multilayer ceramic electronic component of the present example, the protective layer may be disposed only on one side of the reference plane, so that a through region having a large single through area 251 in which the protective layer is not disposed may be formed, and electrical connectivity may be improved through the through region having the large area, and flexural strength of the multilayer ceramic electronic component maybe improved due to the protective layer disposed on one side of the reference plane in the third direction.

Figure 5:
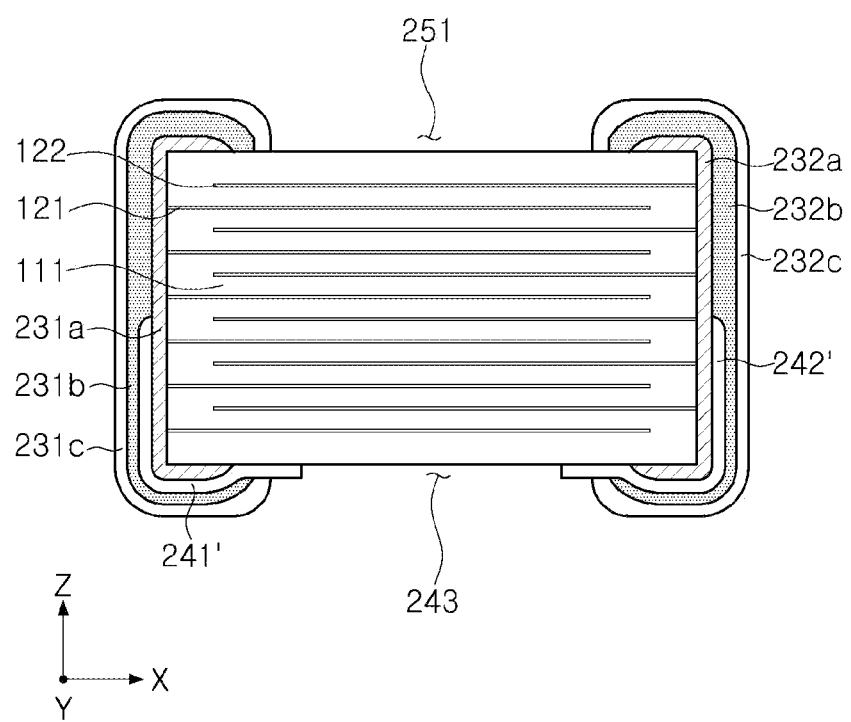
FIG. 5 is a cross-sectional view schematically illustrating a multilayer ceramic electronic component according to one embodiment of the present disclosure.

In the above example, the protective layer 241' and 242' may be disposed on one side of the reference plane in the third direction among the surfaces of the first electrode layer and the second electrode layer. The through region formed on the first electrode layer and the second electrode layer may be 50% or more of the sum of surface areas of the first electrode layer and the second electrode layer as described above, and as shown in FIG. 5, as necessary, a separate through region 243 may be formed and disposed on the ceramic body.

Figure 6:
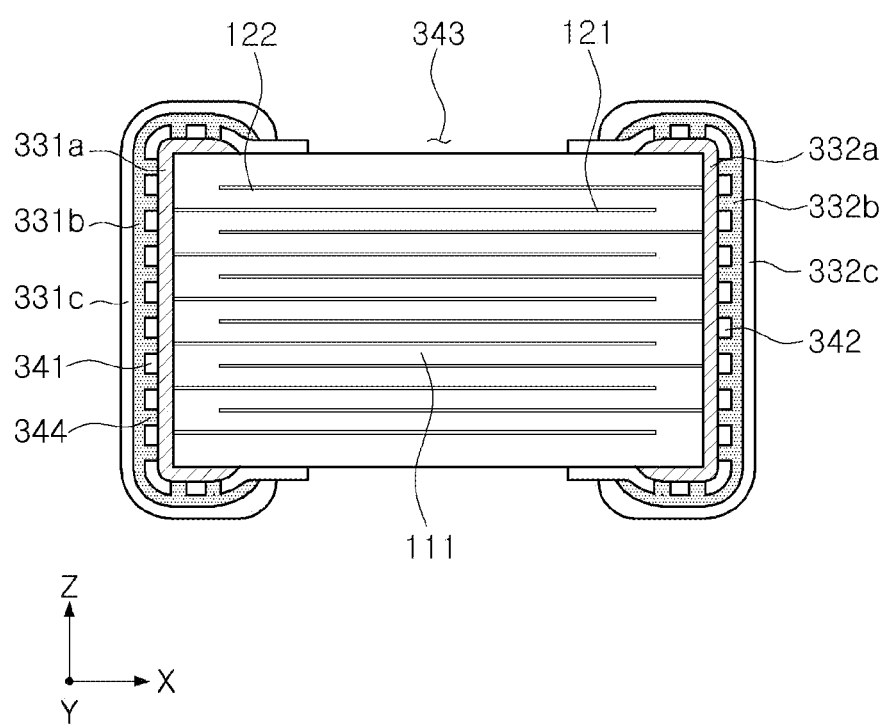
FIG. 6 is a cross-sectional view schematically illustrating a multilayer ceramic electronic component according to one embodiment of the present disclosure.
Figure 7:
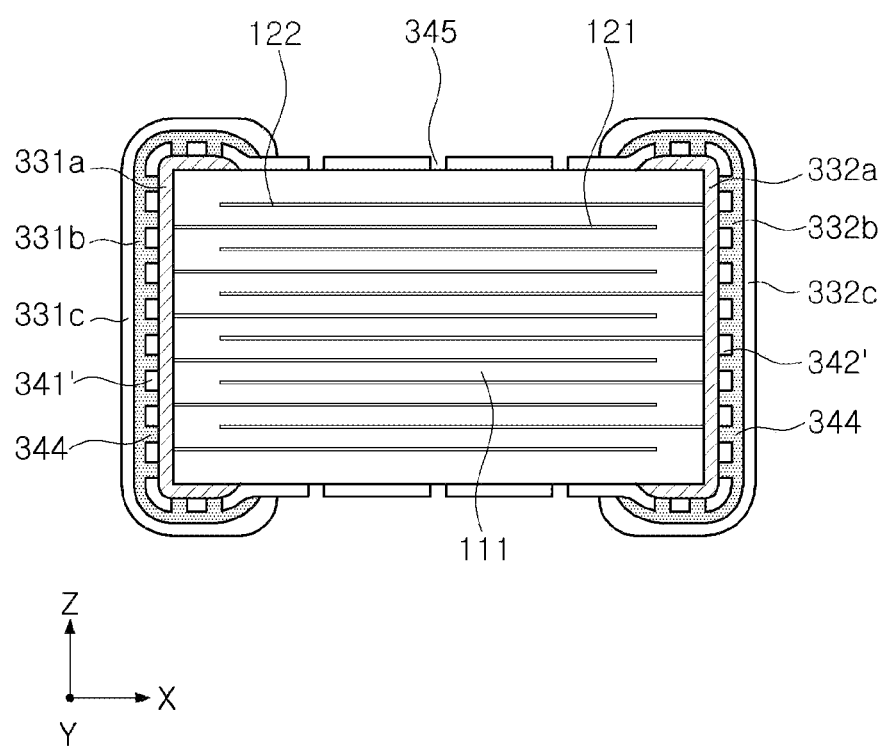
FIG. 7 is a cross-sectional view schematically illustrating a multilayer ceramic electronic component according to one embodiment of the present disclosure.

In another example, the protective layer of the multilayer ceramic electronic component according to the present disclosure maybe disposed over an entirety of surfaces of the first electrode layer and the second electrode layer. FIGS. 6 and 7 is a cross-sectional view schematically illustrating a multilayer ceramic electronic component according to the present example. Referring to FIGS. 6 and 7, Referring to FIGS. 6 and 7, the protective layer 341 and 342 of the multilayer ceramic electronic component according to the present example may be disposed on the entire surface of the first electrode layer 331a and the second electrode layer 332a. . . In this example, since the protective layer and the through region 344 are evenly disposed over all regions of the first electrode layer 331a and the second electrode layer 332a, it is possible to prevent the mechanical strength of the multilayer ceramic electronic component from deteriorating only in a specific direction. In addition, as shown in FIGS. 6 and 7, a separate through region 343 and 345 may be formed and disposed on the ceramic body as needed.

In another example, the protective layer 341' and 342' of the multilayer ceramic electronic component according to the present invention may be disposed over the entirety of the ceramic body. The protective layer may have high strength through a curing reaction as described later, and when the protective layer is disposed over the entirety of the ceramic body, the flexural strength of the multilayer ceramic electronic component may be improved.

The protective layer according to the present disclosure may include an organosilicon compound. The organosilicon compound may be formed of a material having a hydrophobic functional group, and may form a cross-linked bond with the surface of the ceramic body, the first electrode layer, and the second electrode layer. In the present specification, "bonding" may mean a state in which a surface of an adhering material and an adherend is bonded by bonding force of an interface. The bonding force of the interface may be due to a chemical interaction between the adhering material and the surface molecule of the adherend, or may be due to mechanical bonding. In the present specification, the "crosslinked bond" may mean forming a network structure through chemical/physical bonding such as covalent bonding, ionic bonding, Van der Waals bonding, or hydrogen bonding between molecules and molecules.

An epoxy resin, or the like, which was used an external reinforcing material, does not have a water repellent effect, so it may be difficult to effectively suppress the penetration of moisture, and lifting may occur due to gas generation during the curing process or cracking due to overcuring may occur. Inorganic compounds such as ceramic materials do not have a functional group capable of forming cross-linked bonds even when applied to the surface of the body, resulting in a problem that the bonding strength of the protective layer decreases. The protective layer according to the present disclosure may have more excellent bonding strength by being connected to the ceramic body, the first electrode layer, and the second electrode layer through the aforementioned cross-linked bonds.

In an example of the present disclosure, the protective layer of the multilayer ceramic electronic component according to the present disclosure may include a polyfunctional alkoxy silane. Since the alkoxy silane has hydrophobicity, moisture penetration and contamination can be prevented, and flexural stress mechanical strength can be improved through a curing reaction.

In one example, the protective layer may include a silane coupling agent. In this case, in the protective layer, one end of a silicon (Si) atom may be covalently bonded or hydrogen bonded to the surface of the ceramic body and the first and second electrode layers, and the other end of the silicon (Si) atom may be bonded to a hydrophobic functional group.

Specifically, the silane coupling agent has two functional groups having different reactivity in one molecule, that is, a hydrophilic group and a hydrophobic group, and may be represented by the following [Chemical Formula 1].

[Chemical formula 1]

wherein, $R_3$ is a hydrolysis hydrophilic functional group, and X is a nonhydrolyzable hydrophobic functional group.

$R_3$ is a functional group or a chemical structure that chemically bonds with an inorganic material, and may be an alkoxy group (R—O) having an alkyl group having 1 to 16 carbon atoms such as methoxy ($CH_3O$—) and ethoxy ($C_2H_5O$—).

The X may be a functional group or a chemical structure having an epoxy group, a vinyl group ($CH_2CH$—), an amino group (—$NH_2$), an acrylic group, a methacrylic group, a mercapto group (SH—), and the like, but is not limited thereto.

Specific examples of the silane coupling agent may include 3-glycidoxypropyltrimethoxysilnae (GPTMS), 3-glycidoxypropyltrimethoxysilnae (3-glycidoxypropyltriethoxysilnae; GPTES), and vinyl triethoxysilane. (Vinyltriethoxsilane), aminopropyltrimethoxysilane (APTMS), and the like, but is not limited thereto. These silane coupling agents may be used alone or in combination of two or more.

It is preferable that the protective layer of the present disclosure is formed in a weight thickness range of 0.25 g/m² to 30.0 g/m², preferably 0.5 g/m² to 2.0 g/m² in terms of silicon atoms. When the weight thickness of the protective layer (in terms of silicon atoms) is less than 0.25 g/m², it may be difficult to improve moisture resistance due to poor adhesion to the dielectric layer. In addition, when the weight thickness (in terms of silicon atoms) of the protective layer exceeds 30.0 g/m², only manufacturing costs may increase without further improvement in adhesion.

In some embodiments of the present disclosure, the protective layer of the multilayer ceramic electronic component may be formed by applying a paste including the organosilicon compound described above to the first and second electrode layers and performing a heat-treatment of the same, or using by an atomic layer deposition (ALD) method, a molecular layer deposition (MLD) method, a chemical vapor deposition (CVD) method, a sputtering method, and the like, but is not limited thereto.

The method of forming a through portion of the protective layer is not particularly limited. For example, the through portion having a large area may be formed by applying the paste for forming the protective layer described above to only a portion of surfaces of the multilayer ceramic electronic component. The through portion having a relatively small area can be formed by mixing acrylic-based polymer beads such as poly methyl methacrylate (PMMA) and poly ethyl methacrylate (PEMA) in the paste for forming the protective layer, and thermally decomposing it during a heat treatment process.

In an embodiment of the present disclosure, a protective layer may be disposed on the first electrode layer and the second electrode layer of the multilayer ceramic electronic component of the present disclosure, and a first conductive layer and a second conductive layer may be disposed on the protective layer. A portion of the first conductive layer and the second conductive layer may be disposed on the protective layer, respectively, and a remaining portion of the first conductive layer and the second conductive layer may be disposed to be in contact with the first electrode layer and the second electrode layer through the through portion of the aforementioned protective layer.

According to an example of the present disclosure, first and second conductive layers respectively disposed on the first and second electrode layers of the multilayer ceramic electronic component may be plating layers. The first and second conductive layers may contain nickel (Ni) in the greatest amount, and may include one or more selected from a group consisting of copper (Cu), tin (Sn), palladium (Pd), platinum (Pt), gold (Au), silver (Ag), tungsten (W), titanium (Ti), lead (Pb), and alloys thereof. The plating layer may be formed as a single layer or a plurality of layers, and may be formed by sputtering or electrolytic plating, but is not limited thereto.

At least a portion of the first conductive layer and the second conductive layer of the multilayer ceramic electronic component according to the present disclosure may be disposed to be in contact with the first electrode layer and the second electrode layer, respectively. A portion of the first conductive layer and the second conductive layer, disposed to be in contact with the first electrode layer and the second electrode layer may be disposed inside the through portion of the protective layer. A portion of the first conductive layer and the second conductive layer disposed inside the through portion may be that a first conductive layer and a second conductive layer are disposed in an uncoated region of the paste for forming the protective layer or inside a space generated by thermal decomposition of the polymer beads as described above.

In one example, a first conductive layer 131b of the multilayer ceramic electronic component 100 of the present disclosure may be disposed to cover at least a portion of the first electrode layer 131a, and a second conductive layer 132b may be disposed to cover at least a portion of the second electrode layer 132a. In the present specification, a member is disposed to cover a certain region, which may mean that the member is disposed so that a portion of the member covering the region is not observed from the outside.

According to an example of the present disclosure, first and second metal layers respectively disposed on the first and second conductive layers of the multilayer ceramic electronic component may be plating layers. The first and second metal layers may contain tin (Sn) in the greatest amount, and may include one or more selected from a group consisting of copper (Cu), nickel (Ni), palladium (Pd), platinum (Pt), gold (Au), silver (Ag), tungsten (W), titanium (Ti), lead (Pb), and alloys thereof. The plating layer may be formed as a single layer or a plurality of layers, and may be formed by sputtering or electrolytic plating, but is not limited thereto.

EXPERIMENTAL EXAMPLE

An ESR test was performed by using a mass-produced chip with an external electrode formed on a surface of the ceramic body in a length direction, having a temperature characteristic of X7R and a capacity of 2.2 μF and having a 0603 size (Length×Width×Thickness: 0.6 mm×0.3 mm×0.3 mm) from Samsung Electro-Mechanics. In an Example, a through portion having a small size was formed using acrylic (PMMA)-based beads. In the above embodiment, a proto-type chip having a through portion formed in a region corresponding to about 60% of the protective layer was used, and in the Comparative example, a chip in which a protective layer is formed on entire surfaces of the first electrode layer, the second electrode layer, and the ceramic body was used. On the protective layer, a nickel plating layer and a tin plating layer were sequentially formed.

TABLE 1

|  | ESR (mΩ) | | |
| --- | --- | --- | --- |
|  | Average | Minimum | Maximum |
| Comparative example | 9.78 | 8.75 | 11.34 |
| Example | 4.32 | 3.24 | 6.91 |

Referring to Table 1, it can be seen that the Example exhibited an ESR reduction effect of about 55.83% from an average value, compared to Comparative example. Thereby, it can be seen that the multilayer ceramic electronic component according to the present disclosure can effectively reduce an ESR.

As set forth above, according to one of the various effects of the present disclosure, a flexural strength of a multilayer ceramic electronic component may be improved.

According to one of the various effects of the present disclosure, an increase in ESR of a multilayer ceramic electronic component may be suppressed.

According to one of the various effects of the present disclosure, a multilayer ceramic electronic component having excellent reliability may be provided.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
    a ceramic body including a dielectric layer, and a first internal electrode and a second internal electrode disposed to be alternately stacked in a third direction with the dielectric layer interposed therebetween, and including first and second surfaces opposing each other in a first direction, third and fourth surfaces opposing each other in a second direction, and fifth and sixth surfaces opposing each other in the third direction;
    a first external electrode connected to the first internal electrode and including a first electrode layer, a first conductive layer, and a first metal layer;
    a second external electrode connected to the second internal electrode and including a second electrode layer, a second conductive layer, and a second metal layer; and
    a protective layer disposed on the ceramic body, the first electrode layer, and the second electrode layer,
    wherein the protective layer comprises a plurality of through portions on the ceramic body, the first electrode layer, and/or the second electrode layer,
    wherein an end of the protective layer is positioned between planes corresponding to the fifth and sixth surfaces,
    wherein the first conductive layer and the second conductive layer are plating layers, and
    wherein a total surface area of the first electrode layer and the second electrode layer on which the protective layer is not disposed is 50% or more of a total surface area of the first electrode layer and the second electrode layer.

2. The multilayer ceramic electronic component of claim 1,
    wherein the first external electrode comprises the first electrode layer, the protective layer, the first conductive layer, and the first metal layer sequentially disposed on the ceramic body in an order listed,
    wherein the second external electrode comprises the second electrode layer, the protective layer, the second conductive layer, and the second metal layer sequentially disposed on the ceramic body in an order listed,
    wherein the first electrode layer and the first conductive layer are connected, and the second electrode layer and the second conductive layer are connected through the plurality of through portions of the protective layer.

3. The multilayer ceramic electronic component of claim 1, wherein a portion of the first electrode layer is disposed on the first surface of the ceramic body, and a remaining portion of the first electrode layer is disposed to extend onto the third to sixth surfaces of the ceramic body,
    wherein a portion of the second electrode layer is disposed on the second surface of the ceramic body, and a remaining portion of the second electrode layer is disposed to extend onto the third to sixth surfaces of the ceramic body.

4. The multilayer ceramic electronic component of claim 1, wherein the protective layer is disposed on an end region of the first electrode layer and/or the second electrode layer, and
    the first conductive layer and the second conductive layer are disposed on the protective layer.

5. The multilayer ceramic electronic component of claim 1, wherein the first electrode layer and the second electrode layer are sintered electrodes including a conductive metal.

6. The multilayer ceramic electronic component of claim 1, wherein when a virtual plane, passing through a center of the ceramic body and perpendicular to the third direction is referred to as a reference plane, the protective layer is disposed on one side of the reference plane in the third direction among surfaces of the first and second electrode layers.

7. The multilayer ceramic electronic component of claim 1, wherein the protective layer comprises an organosilicon compound.

8. The multilayer ceramic electronic component of claim 7, wherein the protective layer comprises a multifunctional alkoxy silane.

9. The multilayer ceramic electronic component of claim 1, wherein the first metal layer and the second metal layer are plating layers.

* * * * *